June 11, 1963  E. A. TAYLOR, JR  3,093,787
ELECTRICAL APPARATUS FOR PRODUCING A VARIABLE FREQUENCY
Filed Dec. 4, 1959

INVENTOR.
ERNEST A. TAYLOR, JR.
BY
ROBERT L. BROAD, JR.
ATTORNEY

United States Patent Office 3,093,787
Patented June 11, 1963

3,093,787
ELECTRICAL APPARATUS FOR PRODUCING A VARIABLE FREQUENCY
Ernest A. Taylor, Jr., Decatur, Ala., assignor, by mesne assignments, to Monsanto Chemical Company, a corporation of Delaware
Filed Dec. 4, 1959, Ser. No. 857,462
1 Claim. (Cl. 321—61)

This invention relates to electrical apparatus and more particularly to electrical apparatus for producing an alternating voltage output of variable frequency.

In modern manufacturing installations, variable frequency voltage sources are commonly used in speed controlling systems. The present invention contemplates a variable frequency voltage source which takes the form of a rotating tap switch in which commutation is effected by movable brushes. By employing movable brushes in conjunction with a stationary flat commutator the variable frequency source becomes a piece of apparatus which is extremely stable and is unaffected by load changes. In prior art installations, where the rotor of a dynamo-electric type variable frequency voltage source is driven, increases in the value of load current have inevitably tended to cause frequency drift and deviation.

According to the present invention, the rotational speed of the brush holder assembly is limited only by the centrifugal forces which this component can withstand. The rotation of such a brush holder assembly rather than the conventional technique of rotating the rotor of a dynamo electric machine renders greatly increased angular velocities entirely practicable. As a result, correspondingly higher frequency outputs and faster response times may be realized. In addition, frequency variations caused by changes in load are entirely eliminated because of the manner in which the load current is drawn from the primary power source.

Accordingly therefore, a primary object of the present invention is to provide a variable frequency source which utilizes a rotatable brush holder in conjunction with a stationary core and commutator for the purpose of providing higher output frequencies and rapid response to control demands.

Another object of the invention is to teach structure and components for producing pre-selected values of output frequency.

A further object of this invention is to provide an apparatus for generating an output signal of pre-selected frequency value by using a flux permeable core provided with a single winding in conjunction with a rotatable brush and slip ring assembly.

These and other objects and advantages of the present invention will become apparent by referring to the accompanying detailed description and drawings, in which.

Figure 1:
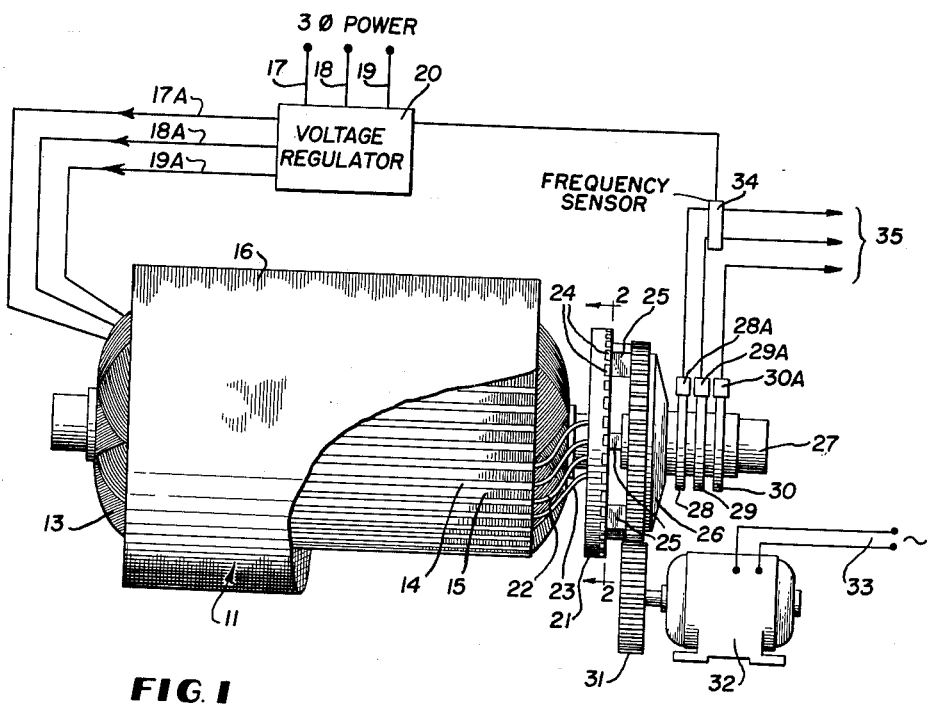
FIGURE 1 is a fragmentary view of a core and winding structure used in one embodiment of the invention, along with the other components used in generating a variable frequency output potential.

Turning to the detailed description of the invention and more particularly to the drawings, reference to FIGURE 1 will now be made. The reference numeral 11 has been used in this figure to indicate generally a stationary metallic core constructed of material which is readily permeable to magnetic flux. For instance, this core may include a plurality of stacked laminations of the type normally used in constructing electric power equipment such as transformers, motors and similar equipment.

The core 11 is provided with a winding 13 which is disposed to form a plurality of turns or coils which rest in a number of slots extending along the axial surface of the core. The winding 13 forms a single electrically continuous winding of the distributed coil type. It will be appreciated by those skilled in the art that this type of winding corresponds with the array of conductors which are employed in winding the stator of a polyphase induction motor or like device to produce a flux tuft which rotates at synchronous speed. In general, correlation between the electrical and geometrical placement of such a distributed winding in the appropriate slots is necessary in order to provide for a rotating magnetic field.

It should be appreciated that the single winding 13 which is employed in practicing the invention may be wound to provide any number of poles on the iron core 11. However, with a larger number of poles, the available variation in frequency output for the same synchronous speed is correspondingly increased.

The component coils of the single winding 13 are retained within appropriate radially disposed slots in the core 11 by means of conventional slot wedges 14, or the like. Between the slot wedges 14, the appearance of the contiguous surfaces formed by laminations 15 is believed clearly illustrated.

The circular surface defined by the outer periphery of the laminations is completely covered by means of a permeable annular shield 16. The shield 16 is constructed of material which is readily permeable to magnetic flux, and is placed around the core in order to provide a continuous flux path for the rotating magnetic field produced by the distributed coil winding. The shield 16 may take the form of a plurality of stacked annular laminations secured by rivets or any other conventional manner.

The electrical energy which is used to energize the winding 13 in FIGURE 1 is received over a set of input bus conductors identified by the reference numerals 17, 18 and 19. This electrical energy is subjected to the influence of a conventional voltage regulator 20. The voltage available at the output terminals of the regulator 20 is applied to the winding 13 by way of a group of three conductors identified by the reference numerals 17A, 18A and 19A which are connected to the winding 13 at separate points spaced 120 electrical degrees apart.

On the opposite end of the core assembly, each and every coil of the distributed winding is brought out and connected to one of the conductive segments provided in a radial or flat-faced commutator 21. The reference numerals 22 and 23 are used to show the typical taps or interconnections between the leads of the individual coils and the commutator segments 24.

Figure 2:
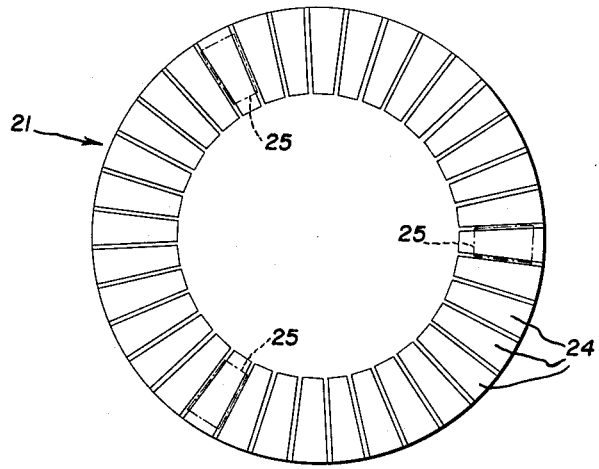
FIGURE 2 is a sectional view taken along lines 2—2 of FIGURE 1 showing the configuration of the commutator.

The configuration of the flat-faced commutator 21 is best appreciated from inspection of FIGURE 2, in which the disposition of the several conductive segments 24 is illustrated. These segments are slidably engaged by a set of brushes 25 spaced 120 electrical degrees apart. The placement of these brushes is illustrated in FIGURE 1, and also indicated somewhat diagrammatically by dashed lines on the surface of the flat-faced commutator illustrated in FIGURE 2.

The brushes 25 shown in FIGURE 1 are supported upon a rotatable brush holder 26. The brush holder 26 is provided with a gear-toothed peripheral surface for the purpose of receiving driving torque from a motor-driven gear 31 illustrated immediately below. It will be noted that the holder 26 is journaled for rotation by means of appropriate bearings or the like on a stationary shaft 27.

A set of slip rings 28, 29 and 30 are affixed to the rotatable brush holder 26 for simultaneous rotation therewith and are, of course, electrically isolated from this unit. Each of the slip rings 28, 29 and 30 is connected to one of the brushes 25. The variable frequency output signal available at the slip rings 28, 29 and 30 is sampled by means of a set of slip ring brushes 28A, 29A and 30A and is applied to a set of output load conductors 35.

The toothed peripheral surface of the brush holder 26 in FIGURE 1 receives torque from the gear 31 which is driven by a conventional variable speed electric motor 32. The motor 32 received energizing power from a suitable source of potential by means of a set of input conductors 33.

Returning momentarily to the upper portion of FIGURE 1, reference is made to a frequency sensor 34 of a well known type. In order to secure the proper output voltage required by a variable frequency motor at different frequencies it is necessary to provide an adjustable input voltage for the system. To this end, the frequency sensor 34 is connected in one of the output conductors 35 to continually monitor the generated output frequency and/or volts-per-cycle ratio and derive a signal related to the magnitude and direction of any deviations therein. The signals thus produced are applied to the voltage regulator 20 for the purpose of correlating the magnitude of potential applied to conductors 17A, 18A and 19A with the value of output frequency. The voltage regulator 20 may take the form of a device which includes a magnetic amplifier or a variable voltage transformer driven by a reversible pilot motor, and the variable polarity output potential from the frequency sampler 34 may be used to drive the motor in one or the other direction, depending upon the magnitude and sense of the detected deviation in output frequency and/or volts-percycle ratio.

In operation, electric power of appropriate magnitude is supplied to the stationary winding 13 via the conductors 17A, 18A and 19A. The rotatable brush holder 26 is simultaneously rotated by the electric motor 32 through the gear 31 at a preselected speed in order to produce the desired output frequency. By rotating the brush holder in this fashion, it is possible to continuously vary the phase relationship of each brush or output lead with respect to that of the input conductors. With this mode of operation, the device functions as a rotary tap switch. By turning the rotatable brush holder 26 in the direction of phase rotation of the incoming power, the output frequency comprises the difference between the two rotations when each is expressed in cycles per second. Conversely, turning the brush holder assembly against the direction of phase rotation of the incoming power produces an output frequency which equals the sum of the two rotations expressed in c.p.s.

Since the commutator and brushes act as a rotating tap switch, no torque is produced by drawing load current from the frequency changer. As a result, the motor 32 which rotates the brush holder must overcome only the friction and windage of the assembly, and variations in frequency are not occasioned by changes in the load current drawn through the frequency changer. Since this load is entirely supported by the primary power source, the output frequency of the invention is just as stable as the input frequency and the degree to which the rotational speed of the motor 32 can be maintained. The speed of the rotatable brush holder and associated components is, of course, limited only by the value of centrifugal force which the assembly is capable of withstanding. Since the rotation of the brush holder assembly instead of the rotor of the frequency changer reduces the mass of rotating material and makes possible a smaller diameter assembly, greatly increased speeds are possible with resultingly higher output frequencies and shorter response times. It should be appreciated that the inventive assemblage may be cooled by air blast or by immersion in oil in the manner employed in cooling transformers, and the like.

It is to be understood that the embodiment disclosed herein merely illustrates the invention and that numerous other embodiments may be contemplated without departing from the spirit and scope of the invention.

What I claim is:

An apparatus for producing an output potential of predetermined frequency and voltage, comprising a stationary permeable core having a plurality of slots, a distributed winding mounted in said slots to form sets of coils, a permeable shield attached to and enclosing said core, a radial commutator provided with conductive segments connected respectively to said coils, a brush holder journaled for rotation with respect to said core, a group of three brushes supported by said holder and disposed to slidably engage said conductive segments during rotation of said holder, means including slip rings and slip ring brushes mounted on said holders and electrically connected to said brushes for rendering available said output potential therefrom, a polyphase power supply, magnetic amplifier means connected between the power supply and the winding, and a voltage monitor connected between the slip brushes and the magnetic amplifier for adjusting the input voltage to the winding to thereby obtain a uniform output voltage at said brushes.

References Cited in the file of this patent

UNITED STATES PATENTS

| | | |
|---|---|---|
| 479,951 | Marvin | Aug. 2, 1892 |
| 522,241 | Thomson | July 3, 1894 |
| 1,245,356 | Koppitz | Nov. 6, 1917 |
| 1,499,360 | Fortescue | July 1, 1924 |
| 1,499,918 | Fortescue | July 1, 1924 |
| 1,642,438 | Granat | Sept. 13, 1927 |
| 2,468,569 | Mead | Apr. 26, 1949 |
| 2,668,941 | Granat | Feb. 9, 1954 |
| 2,738,425 | Heath | Mar. 13, 1956 |
| 2,864,963 | Dornstreich et al. | Dec. 16, 1958 |
| 2,995,696 | Stratton et al. | Aug. 8, 1961 |